Patented Apr. 29, 1924.

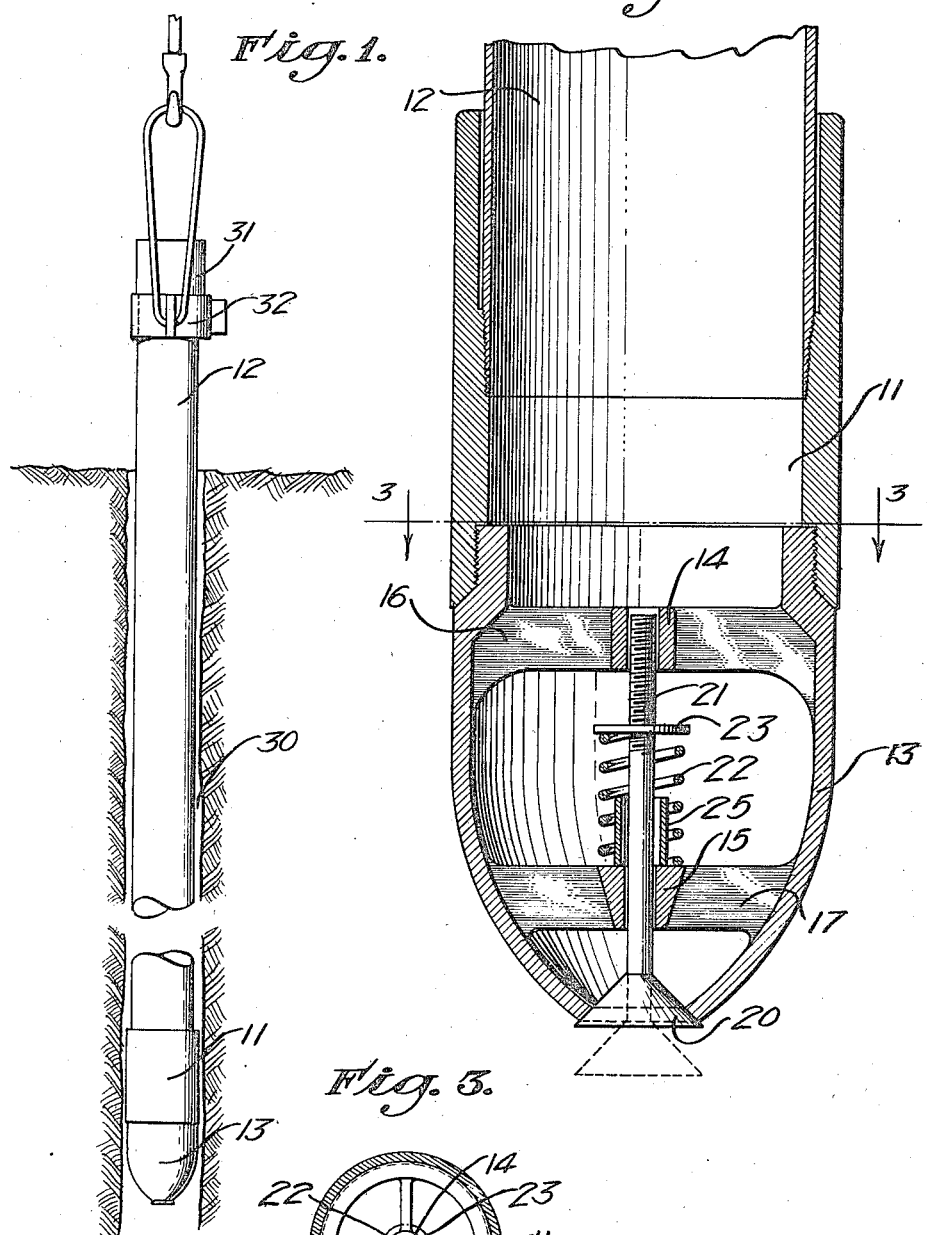

1,491,915

UNITED STATES PATENT OFFICE.

WILLIAM L. McLAINE, OF LOS ANGELES, CALIFORNIA, ASSIGNOR OF ONE-HALF TO WILLARD L. BUROUGH, OF FULLERTON, CALIFORNIA.

FLOAT PLUG.

Application filed September 28, 1922. Serial No. 591,163.

*To all whom it may concern:*

Be it known that I, WILLIAM L. McLAINE, a citizen of the United States, residing at Los Angeles, in the county of Los Angeles and State of California, have invented a new and useful Float Plug, of which the following is a specification.

My invention relates to the art of drilling oil wells. In that art it is necessary after a well has been drilled to place in the well a string of casing consisting of joints of pipe secured together by suitable couplings; this casing is often twelve inches or more in diameter and it may consist of several thousand feet of heavy pipe. The strain upon the derrick of the oil well when handling these long strings of casing is considerable and it is an object of my invention to provide means for reducing the strain upon the derrick.

This I accomplish by floating the casing as it is lowered into place in the water or mud with which the hole is filled. For the purpose of making this floating practical, I employ what I have called a float plug which is secured to the bottom of the casing and which is operated as will hereinafter be explained.

Further objects and advantages will be made evident hereinafter.

Referring to the drawing which is for illustrative purposes only,

Fig. 1 is a view of a portion of an oil well with a string of casing being lowered in place therein.

Fig. 2 is a section through a float plug embodying my invention.

Fig. 3 is a section on a reduced scale on a plane represented by the line 3—3 of Fig. 2.

In the form of my invention illustrated, I employ a coupling member 11 which is threaded at its upper end to receive the casing 12 and which is threaded at its lower end to receive the body 13. This body is provided with two hubs 14 and 15 carried on arms 16 and 17. Sliding in holes in the hubs 14 and 15 is a stem 21 of a valve 20. The valve 20 is preferably of conical form and is normally seated in an opening in the bottom of the body 13 by means of compression spring 22 acting between the hub 15 and a nut 23 carried on the threaded portion of the stem 21. A spacer 25 resting on the hub 15 inside the spring 22 acts to limit the downward movement of the valve 20 by providing an abutment against which the nut 23 strikes after the spring 22 has been partially compressed.

In placing the casing 12 in an oil well 30 the casing 12 may be suspended by a collar 32 which rests upon and is supported by any suitable and well known form of casing elevator 31.

The form of the body 13 makes it especially suitable for guiding the casing into the hole as it is rounded off to provide a smooth surface which slides into place without catching on projections in the hole. The valve 20 being held against its seat by the spring 22 and the hole 30 being full of water, it is evident that advantage can be taken of the buoyancy of the empty pipe which may be diminished by partially filling the casing with water by inserting a hose in its upper end. By using the buoyancy of pipe to float the pipe, the weight that must be carried by the elevator 32 is greatly reduced.

After the casing has reached its lower position it may be cemented in place in the usual manner by forcing cement down through the inside thereof. This cement being driven by a column of water filling the entire interior of the casing above the cement which water is also under some pressure at the surface of the ground due to its being supplied by mud pumps in the usual manner, exerts a pressure upon the valve 20, forcing it downwardly and opening it to allow the cement to pass outwardly and upwardly around the pipe in the usual manner due to the circulation previously established. The valve 20 will, however, close whenever the driving pressure is released on the cement, thus preventing the cement from being forced back into the pipe.

The body 13 and the members carried thereby are preferably made of cast iron which is quite friable so that it breaks readily under the bit and can be readily drilled out after the cement has set.

I claim as my invention:—

1. In combination, an imperforate string of casing; a body adapted to be secured to and to entirely close the lower end of said casing so that same may be floated in a well; and valve means carried in said body through which cement may be forced from said casing, said body and valve means being formed of friable cast iron which can be readily drilled out after said cement has set.

2. In combination, an imperforate string of casing; a body adapted to be secured to and to entirely close the lower end of said casing so that same may be floated in a well, the outer diameter of said body being substantially the same as the collars on said casing; and valve means carried in said body through which cement may be forced from said casing, said body and valve means being formed of friable cast iron which can be readily drilled out after said cement has set.

3. A method of placing casing in a well which comprises: closing the bottom end of the casing with friable material; placing said casing in the well; forcing cement through a valve in the lower end of said casing to securely cement said casing in said well; and thereafter drilling out said friable material.

In testimony whereof, I have hereunto set my hand at Los Angeles, California, this 21st day of September, 1922.

WILLIAM L. McLAINE.

DISCLAIMER 1,491,915.—*William L. McLaine,* Los Angeles, Calif. FLOAT PLUG. Patent dated April 29, 1924. Disclaimer filed March 26, 1934, by the patentee, said McLaine, *Willard L. Burough,* assignee of one-half interest, and *Baker Oil Tools, Inc.,* exclusive licensee.

Hereby disclaim from the scope of each of claims 1 and 2 of the specification of said patent, any device or apparatus such as defined in said claims 1 and 2 of said patent other than those having a body adapted to be secured to and to entirely close the lower end of an imperforate string of casing and which body includes a rounded portion projecting below the lower extremity of the imperforate string of casing and adapted to guide the well casing past obstructions as it is lowered into a well bore.

Your petitioners also hereby disclaim that part of the claim in the specification of said patent, namely, claim 3, which is in the following words, to wit:

"3. A method of placing casing in a well which comprises: closing the bottom end of the casing with friable material; placing said casing in the well; forcing cement through a valve in the lower end of said casing to securely cement said casing in said well; and thereafter drilling out said friable material."

[*Official Gazette April 17, 1934.*]